United States Patent
Free

[11] Patent Number: 6,099,192
[45] Date of Patent: Aug. 8, 2000

[54] BALL JOINT

[75] Inventor: Bernard John Free, South-end-on-Sea, United Kingdom

[73] Assignee: Ford Motor Company, Dearborn, Mich.

[21] Appl. No.: 09/096,644

[22] Filed: Jun. 12, 1998

[30] Foreign Application Priority Data

Jun. 14, 1997 [GB] United Kingdom .................... 9712337

[51] Int. Cl.⁷ .................................................. F16C 11/06
[52] U.S. Cl. ........................................... 403/114; 403/122
[58] Field of Search ..................................... 403/122, 128, 403/130, 131, 132, 133, 135, 140, 134, 114, 115

[56] References Cited

U.S. PATENT DOCUMENTS

| 2,860,899 | 11/1958 | Gottschald | 403/130 |
| 4,332,500 | 6/1982 | Smith, Jr. et al. | 403/114 |
| 4,679,957 | 7/1987 | Bauer | 403/115 X |
| 4,974,985 | 12/1990 | Glatzel | 403/114 |

FOREIGN PATENT DOCUMENTS

| 2487458 | 1/1982 | France | 403/128 |

*Primary Examiner*—Harry C. Kim

[57] ABSTRACT

A ball joint has a ball (10) mounted within a ball socket (14) in a body (16). The ball is normally retained in place behind a throat (30) of the socket, but the ball also has a radial projection (32) which will ensure that the ball is held captive in the socket, even after so much wear has taken place that the diameter of the throat is increased. If this does happen, the flange (32) will be retained behind a shoulder (44). In an unworn state, the ball (10) is retained between a bearing surface in the upper spherical part of the socket, between the throat (30) and the shoulder (44) and a pressure pad (48) on the inside of a cap (20) which closes the socket at one end. A pin (12) attached to the ball (10) can freely move within a substantially circular cone as permitted by the radius of the throat (30).

4 Claims, 1 Drawing Sheet

BALL JOINT

BACKGROUND OF THE INVENTION

This invention relates to a ball joint which comprises a ball on the end of a ball pin for use in applications where the primary load on the ball joint is down the axis of the ball pin, the ball being received in a socket so that the ball pin can move angularly relative to the socket, without play. The ball joint thus allows two components to be connected so that they can remain connected and motion can be transmitted between them, over a range of relative angular positions.

1. Field of the Invention

Ball joints of the kind described are used in particular in vehicle suspension and steering mechanisms, and the present invention is particularly suitable for use in a vehicle suspension system. However, the invention is not limited to this application.

2. Disclosure Information

A problem with such ball joints is that the socket is liable to become worn over time, eventually allowing the ball pin to leave the socket with potentially dangerous consequences. One arrangement for reducing this problem has been proposed in U.S. Pat. No. 4,679,957. In this arrangement, a secondary ball is provided, which bears against a secondary bearing surface in the event that the primary ball is freed from its socket. The secondary ball is connected to the primary ball by a shaft, and the secondary ball and the shaft are housed in a slot which permits translation in one dimension. The secondary ball is in contact with a microswitch that triggers an alarm when contact is lost. This arrangement provides a warning that dangerous wear has occurred, and a failsafe mechanism for limiting danger from loss of the pin from the socket. However, it is complex in construction, does not permit full movement of the ball pin, and wear is likely over the relatively small area of contact between the secondary ball and the microswitch.

SUMMARY OF THE INVENTION

According to the invention, there is provided a ball joint comprising a socket formed in a socket body and a ball received in the socket for angular movement relative to the socket body within a conical volume having a substantially circular base plane, wherein the socket comprises a rotationally symmetrical bore through the socket body and the ball has a surface which is partly spherical and which has a projection from the surface, the bore having a first throat through which the spherical surface of the ball cannot pass, a second throat through which the projection cannot pass and an annular bearing surface conforming to the spherical surface of the ball between the first and second throats, the positions and dimensions of the second throat and the projection being such that the ball can freely move in the socket throughout the designed range of relative movement of the ball and socket body within the conical volume, the bore at one end having an opening large enough for the ball diameter to pass through and at the other end an opening, forming the first throat, through which a ball pin to which the ball is fixed can pass with sufficient clearance to allow the desired range of relative movement between the pin and the socket body, the bore being closed at said one end after insertion of the ball and ball pin by a cap which traps the ball in the socket, the cap being provided on its inner surface with a pressure pad that bears against the ball or the projection when the ball joint is in an unworn state, and the second throat being spaced apart from the projection when the ball or the projection is in contact with the pressure pad.

The ball socket is suitable for applications in which high loads are applied down the axis of the ball pin, notably vehicle suspensions.

The pressure (or bearing) pad keeps the ball firmly in contact with the bearing surface of the socket.

The pressure pad is preferably made from the same material as the bearing surface of the socket, notably a low friction material. This reduces wear and facilitates free movement of the ball in the socket.

The pressure pad is preferably provided as a separate element on the inside of the cap. However, it would also be possible to provide the pressure pad as an integral part of the cap.

To provide increased support for the ball in the socket, it is particularly preferred that the regions of the pressure pad and the ball or projection which make contact with each other have complementary spherical surfaces which have a common centre point with the annular bearing surface of the socket.

Under normal operation, the relative movement between the ball and the socket will take place by the spherical surface of the ball moving against the annular bearing surface of the socket, and the ball will be retained in the socket by the first throat. However, if the diameter of the first throat should become so much enlarged, through adverse wear, that it no longer retains the ball, then the projection will come into contact with the second throat and will retain the ball in the socket, to prevent complete separation of the ball and the socket. This is an important safety precaution.

If adverse wear does take place to this extent, the components which are joined by the ball joint will not separate completely but will remain in a connected and therefore useable state, albeit not with their designed functionality.

The projection can take a number of different forms. In one embodiment the projection can be an annular flange which extends from the spherical surface of the ball to a diameter greater than that of the ball.

In another embodiment, the projection can be a mushroom-shaped body on the end of the ball opposite to the ball pin, with the stem of the mushroom shape projecting from the ball, and the head of the mushroom shape mounted on the stem.

In this case, the diameter of the head itself can be less than the diameter of the ball, but the effective diameter of the head, when referred to the centre of the ball will be substantially greater than that of the ball.

The second throat can be formed by a ring which fits into a seat in the bore.

In one embodiment, the second throat may be of smaller diameter than the ball, and can be a non-continuous ring which is fitted into the bore, during assembly to project into the bore. The ring can be a two part or an interrupted ring to allow it to be inserted into the bore around the ball. The ring can be held in place in the bore by the cap.

The invention will now be further described, by way of example, with reference to the accompanying drawings.

DETAILED DESCRIPTION OF THE PREFERRED EMBODIMENTS

Figure 1:
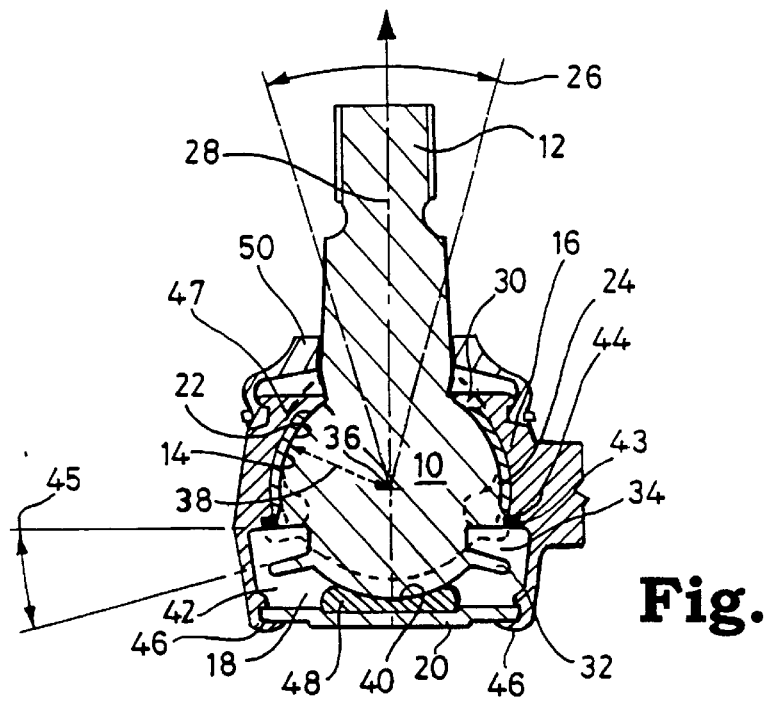
FIG. 1 shows a first embodiment of a ball joint in accordance with the invention.

FIG. 1 shows a ball 10 on the end of a ball pin 12. The ball is received within a socket formed by a bore generally designated 14 in a substantially rigid socket body 16, the socket body 16 being part of a larger component. The socket 14 has an open end at 18 which, in the drawing, is closed by a cap 20.

The assembled joint operates in a conventional manner. The spherical surface 22 of the ball moves against a low friction lining 24 which forms a spherical bearing surface in the socket to allow motion to be transferred between the ball pin and the socket body 16 irrespective of the relative angular positions of these components (within the designed range of angular movement within a cone having a substantially circular base).

In FIG. 1, the designed range of angular movement is indicated by the double headed arrow 26. This is shown in only one plane, but the same range of angular movement will be achievable within a range of 360 degrees around the axis 28.

The ball is held in the socket by a first throat 30, where the diameter of the bearing surface 24 follows the curvature of the ball to an opening which has a diameter less than that of the ball. The opening or throat 30 is substantially circular, having a radius such as to allow the angular movement of the ball pin 12 through the range 26, but to limit this angular movement when the shank of the ball pin 12 comes into contact with an edge of the throat 30.

The ball is also formed with a radially extending flange 32 and an adjacent groove 34. This flange extends beyond the spherical contour of the ball 10, the spherical contour being that defined by the centre point 36 and a radius 38. At the end of the ball opposite to the end of the pin 12, the ball has another spherical surface 40.

The socket body 16 has an enlarged lower chamber 42, below the area which forms the bearing surface for the ball. An abutment ring 44 is fitted at the junction between the bearing surface 24 and the chamber 42. The flange 32 can move without obstruction within the chamber 42, but cannot move past the ring 44.

When the joint is to be assembled, the cap 20 is not in place. First the low friction lining 24 is inserted into the bore 14 which forms the socket. Next the abutment ring 44 is fitted, and this clips into place within a recess 43 within the socket body and this holds the lining 24 in place. The ball and ball pin component 10, 12 is then inserted, with the pin end being passed first through the socket body, from the lower end (as seen in the drawings) so that the pin passes through the throat 30, but so that the ball is retained within the bearing surface in the socket. Finally, the cap 20 is put into place and edges 46 of the socket body are swaged over the cap to hold it permanently in position. In this position, a bearing pad 48 on the inside of the cap 20 presses against the bottom of the ball 10, to keep the ball pressed firmly against the low friction lining 24. The bearing pad 48 and the bottom of the ball 10 have complementary spherical surfaces which have a common centre point 36 with the annular bearing surface 24 and the upper spherical surface 22 of the ball.

A flexible sealing boot 50 is fitted over the ball pin 12 and around the top of the socket housing, in a conventional manner.

In this condition, the ball pin 12 can move through the arc indicated by the arrow 26, in any direction around the axis 28. In accomplishing this movement, there will be no play between the ball pin 12 and the socket body 16.

However, after extended use, there may be some displacement of the low friction lining 24 out through the throat 30. This can lead to a small amount of possible play for the ball in the socket, and once a small amount of movement starts, then that movement itself allows wear to accelerate such that a position is theoretically possible where the width of the throat 30 might become so great that the ball would be able to escape through the throat 30. This situation is indicated in dotted lines 47 in FIG. 1.

To prevent this happening, the ball 10 has a flange 32 which, if the ball moves through the throat 30, will come into contact with the ring 44 to prevent further movement and in particular to prevent separation of the ball and the socket.

It will be noted that with the ball in the central position shown in FIG. 1, the angle 45 subtended between the ring 44 and the flange 32 is one half of the angle indicated by the arrow 26, to ensure that the presence of the flange does not contribute to the limiting of the range of movement of the ball in the socket. The range of movement can be limited either by the abutment between the root of the stem 12 with the edge of the throat 30, or by the abutment of the flange with the ring 44, or by a combination of these two features.

Figure 2:
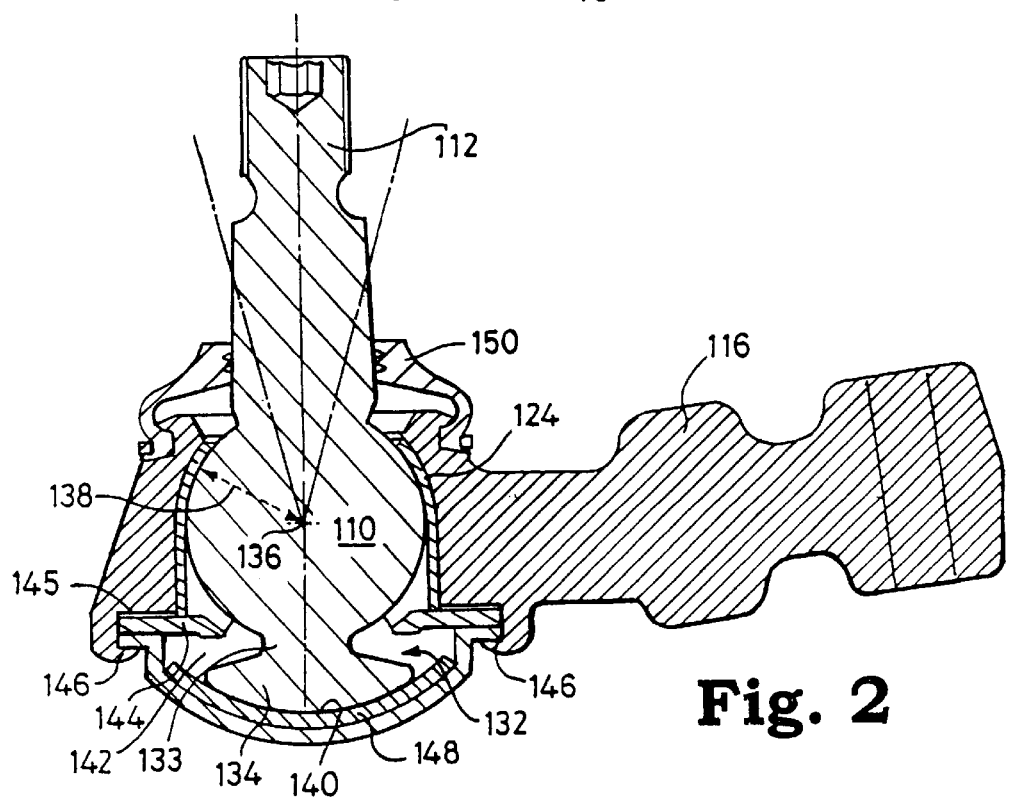
FIG. 2 shows a second embodiment of a ball joint in accordance with the invention.

The joint shown in FIG. 2 is largely similar to that shown in FIG. 1, and equivalent parts carry the same reference numerals increased by 100.

In place of the flange 32, the ball 110 of FIG. 2 has a mushroom-shaped extension 132, with a stem 133 and a head 134. The extension 132 is rotationally symmetric with the ball 110 and the pin 112. However, the diameter of the head itself is slightly less than the diameter of the ball 110, and therefore the retention of the ball cannot be achieved by a ring put into place before the ball and its pin are inserted in the socket.

Instead, the ball 110 is inserted in the socket, as previously described in connection with FIG. 1.

Once the ball is in place, a retaining ring 144 is fitted into the open end of the socket. This ring has to surround the stem 133 and therefore may be made either in two parts or as an interrupted ring which can be moved to fit around the stem 133 before being seated on the seat 145. As before, a cap 120 is then fitted and is held in place by swaging at 146.

The outer face of the head 134 is spherical in form to fit comfortably against the pressure pad 148 which presses against the ball and keeps it in contact with the bearing surface 124. The spherical surfaces all have a common centre point 136.

It will be seen that the ball profile in both FIGS. 1 and 2 is rotationally symmetric, and thus can easily be manufactured in the same turning operation as is conventionally used to machine the ball of a ball joint.

The constructions described here allow a ball joint to be provided with an important safety feature whereby the ball and the socket will not separate, even if there should be so much wear in the joint that the throat which normally retains the ball in the socket becomes enlarged. Very little extra manufacturing is required, as the flange or other projection on the ball will be formed as part of the normal turning operation by which the ball is manufactured.

What is claimed is:

1. A ball joint for allowing angular movement of a ball (10,110) relative to a socket body (16,116) within a conical volume having a substantially circular base plane, said ball joint comprising:

the ball (10,110) attached to a ball pin (12) and having a spherical surface (22) thereon and a projection (32,132) therefrom, said projection (32) comprises an annular flange projecting from said spherical surface of said ball (10);

the socket body (16,116) having a rotationally symmetrical bore (14) therethrough including:
- a first throat (30) through which said spherical surface (22) of said ball (10,110) cannot pass;
- a second throat (44,144) through which said projection (32,132) cannot pass, the second throat (44) is formed by an abutment ring which fits into a recess (43) in said bore;
- an annular bearing surface (24,124) conforming to said spherical surface (22) of said ball (10,110) between said first (30) and second (44,144) throats, said second throat (44,144) and said projection (32,132) being dimensioned and positioned such that said ball (10,110) can freely move in said socket body throughout a desired range of relative movement of said ball within the conical volume;
- a first opening at one end of said rotationally symmetrical bore (14) large enough for said ball to pass through; and
- a second opening disposed at an opposite end of said rotationally symmetrical bore (14), said second opening forming said first throat (30) having sufficient clearance to said ball pin (12) to allow said desired range of relative movement between the pin (12) and the socket body (16,116);
- a cap (20) disposed within said first opening so as to close said rotationally symmetrical bore (14); and
- a pressure pad (48,148) compressed between an inner surface of said cap (20) and said ball (10).

2. A ball joint as claimed in claim 1, wherein said pressure pad (48,148) and said ball (10) each have complementary spherical surfaces where they contact under compression, with each of the complementary spherical surfaces having a common centre point (36,136) with said annular bearing surface (24,124).

3. A ball joint as claimed in claim 1, wherein said pad (48,148) is of a low friction material.

4. A ball joint as claimed in claim 1, wherein said cap (20) is retained by swaging a peripheral edge (46,146) of said socket body (16,116) over said cap (20).

* * * * *